US007769895B1

(12) United States Patent
Williams et al.

(10) Patent No.: US 7,769,895 B1
(45) Date of Patent: Aug. 3, 2010

(54) SYSTEM AND METHOD FOR ENSURING THAT A WEB BROWSER DISPLAYS THE HIGHEST RANKED IMAGE FORMAT POSSIBLE FOR AN IMAGE

(75) Inventors: Neal Williams, Highland, UT (US); Mardell Cheney, Highland, UT (US); Nathan Pilling, Orem, UT (US)

(73) Assignee: Corda Technologies, Inc., Lindon, UT (US)

( * ) Notice: Subject to any disclaimer, the term of this patent is extended or adjusted under 35 U.S.C. 154(b) by 1145 days.

(21) Appl. No.: 10/222,154

(22) Filed: Aug. 16, 2002

Related U.S. Application Data

(60) Provisional application No. 60/313,436, filed on Aug. 17, 2001.

(51) Int. Cl.
   *G06F 15/16* (2006.01)
(52) U.S. Cl. .................. 709/246; 709/203; 709/217
(58) Field of Classification Search ......... 709/201–203, 709/230, 217–219, 246–247
   See application file for complete search history.

(56) References Cited

U.S. PATENT DOCUMENTS

| | | | | |
|---|---|---|---|---|
| 5,168,515 | A * | 12/1992 | Gechter et al. ......... | 379/265.04 |
| 5,764,235 | A * | 6/1998 | Hunt et al. .................. | 345/428 |
| 6,285,999 | B1 * | 9/2001 | Page .............................. | 707/5 |
| 6,473,615 | B1 * | 10/2002 | Theppasandra et al. ..... | 455/445 |
| 6,574,470 | B1 * | 6/2003 | Chow et al. ................. | 455/417 |
| 6,577,311 | B1 * | 6/2003 | Crosby et al. ................ | 345/428 |
| 7,243,122 | B2 * | 7/2007 | Acharya et al. ............. | 709/217 |
| 7,283,808 | B2 * | 10/2007 | Castell et al. ............... | 455/413 |
| 2002/0002607 | A1 * | 1/2002 | Ludovici et al. ............ | 709/223 |
| 2002/0065878 | A1 * | 5/2002 | Paxhia et al. ................ | 709/203 |
| 2002/0075524 | A1 * | 6/2002 | Blair et al. ................... | 358/442 |
| 2002/0112237 | A1 * | 8/2002 | Kelts ............................ | 725/39 |
| 2002/0123879 | A1 * | 9/2002 | Spector ........................ | 704/2 |
| 2002/0124076 | A1 * | 9/2002 | Lindstrom-Tamer ........ | 709/218 |
| 2003/0110182 | A1 * | 6/2003 | Christophersen et al. . | 707/104.1 |
| 2004/0003117 | A1 * | 1/2004 | McCoy et al. ............... | 709/246 |
| 2004/0205645 | A1 * | 10/2004 | Hoffman ..................... | 715/530 |
| 2005/0055344 | A1 * | 3/2005 | Liu et al. ........................ | 707/3 |

OTHER PUBLICATIONS

Internet webpage for Catch Hold of Device Capability, 2 pages, Jun. 2002.

(Continued)

*Primary Examiner*—Patrice Winder
(74) *Attorney, Agent, or Firm*—Madson IP, P.C.

(57) ABSTRACT

A system and method for ensuring that a web browser displays the highest ranked image format possible for an image is provided. In response to a request from a web browser for a dynamic web page, computer-executable code is integrated with the dynamic web page. The computer-executable code is programmed to determine web browser configuration information and request an image according to a set of image formats which are ranked according to ranking criteria and the web browser configuration information. The modified dynamic web page is sent to the web browser. A request for an image is received from the web browser which executes the computer-executable code. The image request identifies the image format for the image selected. The requested image is generated according to the indicated image format and sent to the web browser for display.

35 Claims, 7 Drawing Sheets

OTHER PUBLICATIONS

Internet webpage for Introduction to Image Maps, 2 pages, Jun. 2002.

Internet webpage for HTML Tag Library—the <map> Tag, 2 pages, Jun. 2002.

Internet webpage for Property: Document; embeds, 1 page, Jun. 2002.

Internet webpage for Thau's JavaScript Tutorial, Lesson 3, p. 9, 2 pages, Jun. 2002.

Internet webpage for Displaying Browser Capabilities in Asp.net, 4 pages, Feb. 2001.

Internet webpage for Detecting Browser Capabilities Via Script, 3 pages, Jun. 2002.

Internet webpage for Thau's JavaScript Tutorial, p. 10, 2 pages, Jun. 2002.

Internet webpage for Browserdetection, 5 pages, Nov. 2002.

Internet webpage for Flash Banner Demo, 1 page, Nov. 2002.

* cited by examiner

SYSTEM AND METHOD FOR ENSURING THAT A WEB BROWSER DISPLAYS THE HIGHEST RANKED IMAGE FORMAT POSSIBLE FOR AN IMAGE

RELATED APPLICATIONS

This application is a continuation-in-part of U.S. Patent Application Ser. No. 60/313,436, filed Aug. 17, 2001, for "Best Image Fallback," with inventors Mardell Cheney, Neal Williams, and Nathan Pilling, which is hereby incorporated by reference.

BACKGROUND

1. Field of the Invention

The present invention relates generally to the field of software web browsers and images displayable therein. More specifically, the present invention relates to a system and method for ensuring that a web browser displays the highest ranked image format possible for an image.

2. Description of Related Background Art

The World Wide Web continues to become mainstream and is used by more and more people each day. In fact, publishers of news and other information content often consider supporting and maintaining a website as vital to their business. A single website may be visited thousands of times a day. Each visit includes a request for a web page from a client web browser.

While standard protocols are used for communication between the web browsers and the web server implementing the web site, the web browsers (or simply browsers) may vary greatly. Web browsers are produced by various vendors. Generally, all browsers support basic image display functionality. For example, virtually all browsers support GIF (Graphic Interchange Format) and JPEG (Joint Photographic Experts Group). While some image formats such as PNG (Portable Network Graphics), are supported in certain browsers but not in others.

However, other image formats are unsupported by the browser directly. Instead, a browser may allow for a plug-in to be loaded to support image formats such as SVG (Scalable Vector Graphics), Macromedia's® Flash, and the like. These image formats may be of higher quality, include different interactive aspects, or may be new emerging technologies.

Developers for the web site desire to produce web pages which have mass appeal, meaning virtually all users who come to the web site can view the content of the website. Therefore, although the developers may prefer to use higher quality or more advanced image formats, the developers are conventionally forced to develop web pages for the lowest common denominator among the user's browsers to avoid disappointing any users.

To resolve this problem, web page developers may place computer-executable redirection code such as JavaScript in their web pages. Once a web page is read or interpreted by the browser, the computer-executable redirection code detects which image formats are supported by a user's browser. Based on the image formats supported by the browser, the web page redirects the user to another web page which provides the same image(s) but in a supported image format preferred by the developer.

Alternatively, the web page may be programmed to display a frame within which another page is loaded containing the image in a supported format such as GIF. This technique is referred to as "framing".

Unfortunately, redirection has limitations. Redirection causes a delay as the other web page is loaded which annoys some users. Redirection requires maintenance of a separate web page for each image format available for redirection. Similarly, framing requires that separate web pages be maintained. This maintenance can significantly magnify a developer's workload if a new web page is added or updated on the website.

The maintenance overhead for multiple versions of web pages can increase exponentially. For example, a web page including multiple images in different formats may require that a separate web page for each combination of images having different formats be created. These combinations range from a web page in which all the images are of an advanced format to one in which all the images are of the most basic format.

The maintenance overhead problem is compounded when a website has content which changes rapidly or is produced on the fly. For example, new websites may add or change several hundreds of images in very short time periods depending on the nature of the news. If new web pages are required to support redirection for images in a number of formats, creating and maintaining these website may be impossible, or at least highly susceptible to errors.

In addition, different browser types may require different sets of computer-executable redirection code to detect which image formats are supported. For example, Microsoft's Internet Explorer® browser does not allow use of JavaScript to determine which plug-ins are loaded and enabled. Instead, VBScript (Visual Basic Script) or JScript must be used. Thus, the developer must include both VBScript or JScript and JavaScript in the web page because the developer does not know which type of browser will request the web page. This extra code increases the size of the web page and can slow performance for users.

Even though a browser includes a certain plug-in, the plug-in may not be enabled. Most browsers allow the user to determine which plug-ins are enabled. Therefore, the computer-executable redirection code must include code to determine whether an available plug-in is also enabled.

However, a principal limitation of redirection is the development overhead placed on web page developers. The developers must either include the redirection code in each web page with images, use the lowest common denominator for the image formats, or exclude certain users from access to images on the web pages.

Accordingly, what is needed is a system and method that overcomes the problems and disadvantages of the prior art. In particular, the system and method should allow a developer to develop one version of a web page which includes computer-executable code that ensures that the most preferred format for images on the page is used to display the images without using redirection. In addition, the system and method should automatically determine whether the most preferred image format is supported and enabled in a particular user's web browser and automatically request images on the web page in the most preferred image format which is supported and enabled. Furthermore, the system and method should provide an application programming interface which allows a web page developer to implement the system and method using a minimal amount of computer-executable code. The system and method should allow for display of the most preferred image format for both static and dynamically generated images. And, the system and method should automatically display images of the web page in the next most preferred image format without any additional code written by the web page developer.

BRIEF DESCRIPTION OF THE DRAWINGS

Non-exhaustive embodiments of the invention are described with reference to the figures, in which.

DETAILED DESCRIPTION OF THE PREFERRED EMBODIMENTS

Figure 1:
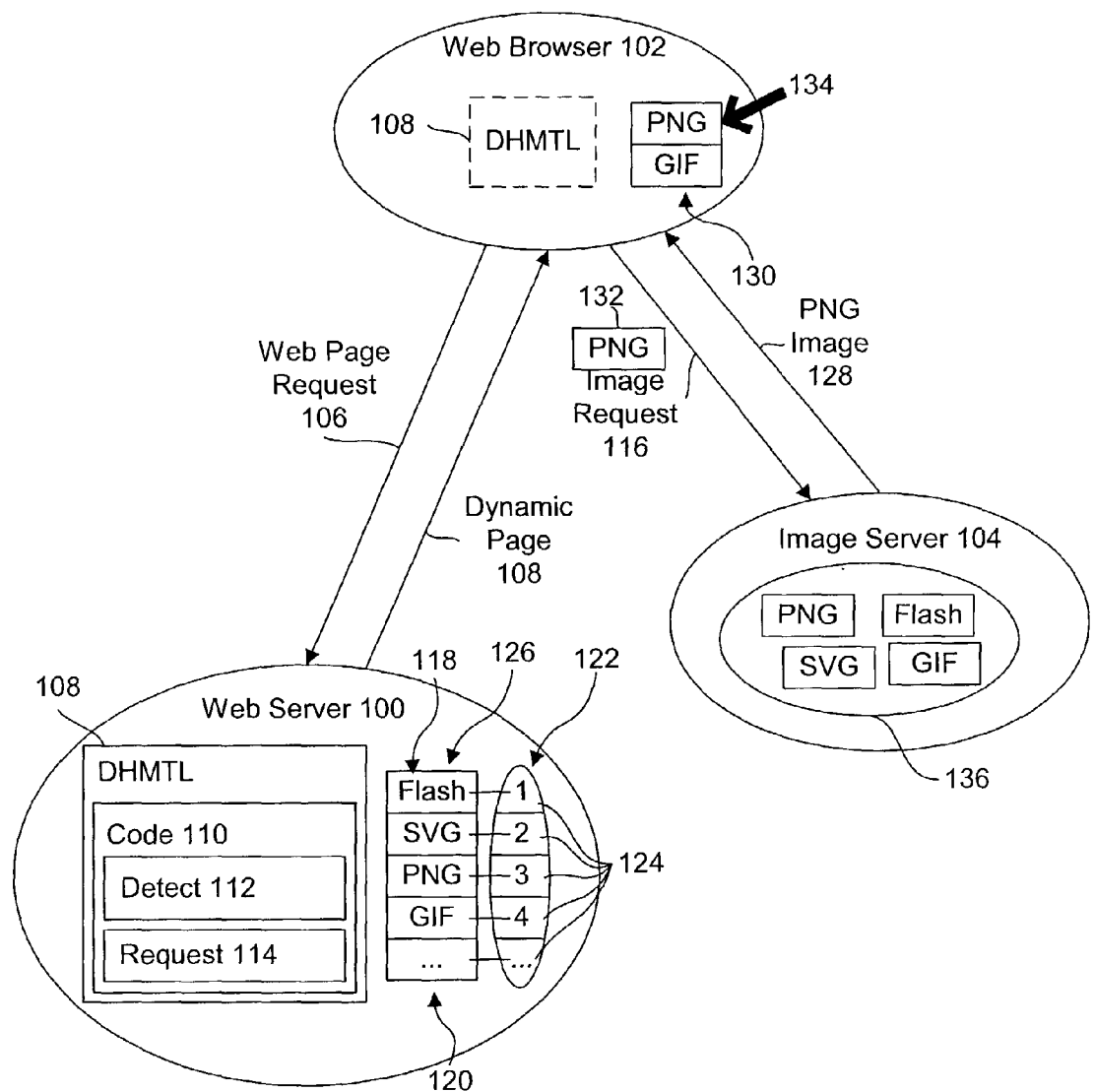
FIG. 1 is a logical block diagram illustrating relationships between components of the present invention.

The present invention relates to a system and method for ensuring that a web browser displays the highest ranked image format possible for an image that addresses all of the above-identified problems and disadvantages.

In one embodiment, a request from a web browser for a dynamic web page causes computer-executable code to be integrated within the dynamic web page. The computer-executable code is programmed to determine web browser configuration information and request an image according to the web browser configuration information and a set of image formats. The set of image formats are ranked according to ranking criteria. Next, the dynamic web page, including the computer-executable code, is sent to the web browser which made the request. The dynamic web page may be in HTML (Hyper Text Markup Language), DHTML (Dynamic Hyper Text Markup Language), XML (eXtensible Markup Language) or any other browser readable format.

An image request is received from the web browser which executes the computer-executable code of the dynamic web page. The image request comprises an indicator of the image format selected based on the web browser configuration information and the ranking criteria. The web browser configuration information may include information such as the type and version for the web browser, which plug-ins are installed, which plug-ins are enabled, which plug-in functionality is enabled, and the like. Next, the requested image is generated according to the indicated image format. The generated image is sent to the web browser for display. The image may be an interactive image.

In one aspect of the invention, the computer-executable code may include computer-executable detection code to detect web browser configuration information. The computer-executable code may also include computer-executable code to request the image according to a highest ranked image format which is displayable in the web browser according to the web browser configuration information. If the highest ranked image format is not displayable by the web browser, the computer-executable code is programmed to request the image according to an image format which is displayable and ranked subsequent to, or next highest to, the highest ranked image format within the ranked set of image formats according to the ranking criteria.

In one aspect of the invention, a set of image formats ranked according to ranking criteria is accessed. At least two image files which represent an image according to different image formats within the set of ranked image formats is generated. Computer-executable code for determining a user's web browser configuration information and for selecting one of the image files according to ranking criteria and web browser configuration information is generated. This computer executable code is integrated within a dynamic web page.

In another aspect of the invention, an application programming interface for detecting a web browser's configuration information and displaying images in an image format selected from a set of ranked image formats is provided. The selected image format is supported by the web browser configuration information and selected according to ranking criteria.

A software object is instantiated by calling functions of the application programming interface. The functions may be called by a web application or script. The software object is configured for use by an image server to provide a customized image. The software object is also configured to designate an image format from the set of ranked image formats as a preferred image format.

An application programming interface function is called for automatically generating browser-specific executable code to determine whether a user's web browser supports the preferred image format indicated by the software object.

The browser-specific executable code is programmed such that when the preferred image format is unsupported, a supported image format ranked next highest to the preferred image format is automatically selected. Accordingly, the browser-specific executable code requests an image from the image server in the supported image format which is ranked next highest to the preferred image format.

In certain embodiments, in response to a request for a dynamic web page, web browser configuration information is determined for the web browser initiating the request. This determination may be made by a web server or other software module.

Next, computer-executable code is integrated with the dynamic web page, the computer-executable code is programmed to request an image according to a set of image formats which are ranked according to ranking criteria and the web browser configuration information. In certain aspects, the computer-executable code is further programmed to request the image based on an image fallback identifier associated with the request in addition to the web browser configuration information and ranking criteria.

The dynamic web page, including the computer-executable code, is sent to the web browser which made the request. An image request is received from the web browser which executes the computer-executable code of the dynamic web page. The image request comprises an indicator of the image format selected based on the web browser configuration information, the ranking criteria, and/or image fallback identifier. Next, the requested image is generated according to the indicated image format and sent to the web browser for display.

In one embodiment, a system is provided which includes a web server that generates computer-executable code based on a web browser identifier. The computer-executable code is integrated into a dynamic web page which is requested by a web browser. The computer-executable code is programmed to determine configuration information for the web browser and to request an image in an image format selected based on the configuration information and selected from a set of image formats which are ranked according to ranking criteria. The system also includes an image server in communication with the web server such that a request for an image from the web browser causes an image to be generated in the requested image format and sent to the web browser for display.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, user selections, network transactions, database queries, database structures, etc., to provide a thorough understanding of embodiments of the invention. One skilled in the relevant art will recognize, however, that the invention can be practiced without one or more of the specific details, or with other methods, components, materials, data sources, variables, parameters, etc. In other instances, well-known structures, materials, or operations are not shown or described in detail to avoid obscuring aspects of the invention.

Referring now to FIG. 1, a logical diagram illustrating components of one embodiment for ensuring that a web browser displays the highest ranked image format possible for an image. The embodiment includes a web server 100. Web servers 100 are well known in the art and generally comprise software which serves up, generates, or transfers, web pages across a network in response to requests for the web pages from web browsers 102 (also referred to herein as browsers 102). Such web servers 100 are also well known to have or access various types of computer-readable media. Examples of web servers 100 include Apache, from the Apache Software Foundation, an organization of developers, www.apache.org, IIS (Internet Information Server) from Microsoft®, of Redmond Wash., Iplanet™ web server enterprise edition, from Sun® Microsystems of Santa Clara Calif., and the like.

This embodiment also includes a standalone image server 104. Those of skill in the art recognize that the web server 100 and image server 104 may be integrated into one software application. Alternatively, the web server 100 and image server 104 may execute on the same or different computer systems.

According to one embodiment, a process for ensuring that the highest ranked image is displayed in the web browser 102 begins with a web page request 106. The web page request 106 is received by the web server 100. The web page request 106 requests that a dynamic web page 108 residing on the web server 100 be sent to the browser 102.

Preferably, a dynamic web page 108 is one formatted according to the HTML (Hyper Text Markup Language) protocol. Alternatively, a dynamic web page 108 may be formatted according to DHTML, XML, the like, or a combination of these. Conventionally, dynamic HTML or a dynamic web page 108 refers to a web page 108 which is generated on the fly in response to a web page request 106. Today, a dynamic web page 108 refers to technologies for changing a web page 108 after the web page 108 is downloaded to the browser 102. (See http://www.webreference.com/dhtml/about.html)

A dynamic web page 108 is one which includes computer-executable code 110 which is executed by a computer (not shown) which executes the web browser 102. The dynamic web page 108 allows the content or appearance of a web page to change after the web page is downloaded. (See www.jessett.com/web sites/dhtml/index.shtml.) The computer-executable code 110 is written in a language readable by the browser 102 and may be JavaScript, VBScript (Visual Basic Script), JScript, Java code, and other similar scripts and/or languages which allow the browser 102 to change aspects of a web page as the web page is being displayed or interacted with by a user.

In one embodiment, the web page request 106 initiates generation of the dynamic web page 108 by the web server 100. The web server 100 executes a software program (not shown, also known as a web application) embodied in a script file (See FIG. 7) stored on the web server 100. The web page request 106 identifies the script file to be executed.

The software program may dynamically generate the dynamic web page 108 and integrate the computer-executable code 110 into the generated dynamic web page 108. The software program may use parameters from the web page request 106 to alter the appearance and/or content of the generated dynamic web page 108.

If the requested dynamic web page 108 is a pre-existing page which includes images, based on the web page request 106, the web server 100 may modify the requested dynamic web page 108 by adding computer-executable code 110. The computer-executable code 110 is preferably integrated with the existing web page elements (not shown) for the dynamic web page 108. Preferably, the computer-executable code 110 is added to the front of the dynamic web page 108 such that the computer-executable code 110 is executed essentially first by the web browser 102.

The computer-executable code 110 includes web browser detection code 112 and image format request code 114. The web browser detection code 112 is a segment of code for determining characteristics of the web browser 102 which executes, or reads, the web browser detection code 112. Certain characteristics may indicate which image formats the web browser 102 supports or is capable of displaying. Other characteristics comprise web browser configuration information (discussed in detail in relation to FIG. 2).

Preferably, the web browser detection code 112 includes a number of boolean variables which are set as different characteristics of the browser 102 are evaluated. If a characteristic matches the expected value, the boolean variable is set to TRUE. Otherwise, the boolean value is set to FALSE.

The image format request code 114 preferably includes one or more conditions which change the content of the dynamic web page 108 based in part on the boolean variables (characteristics of the browser 102). The content is changed such that image requests 116 within the page 108 request images in a preferred image format 118 or a next preferred image format (not shown) depending on the values for the boolean variables. Of course, the image requests 116 may be originally defined to request the images in a basic format, such as GIF which is supported by virtually all web browsers 102.

The preferred image format 118 is preferably one of a plurality of image formats within a set of image formats 120. For example, in the illustrated embodiment, the preferred image format 118 may be Flash, a proprietary format implemented through development tools provided by Macromedia, Inc. of San Francisco Calif. The preferred image format 118 is defined by a developer of the dynamic web page 108. Other image formats within the set 120 may include SVG, PNG, GIF, JPEG (Joint Photographic Experts Group), TIFF (Tagged Image File Format), BITMAP, and others. While these image formats are listed specifically, those of skill in the art readily understand that substantially any new image format may be included within the set 120.

Preferably, the set of image formats 120 are ranked according to ranking criteria 122. The ranking criteria 122 may include any criteria for ordering the image formats in some fashion. Generally, the ranking criteria 122 orders the set of image formats 120 according to a preference. The preference may be one of a developer or a user. The image formats may be ranked numerically by associating a rank 124 such as a number with each image format. Alternatively, only one or two image formats may be ranked by association with a rank 124. In one embodiment, ranking criteria 122 comprises a data structure such as an array associating the image formats with ranks 124. Alternatively, the ranking criteria 122 may comprise an abstract ordering of the image formats implemented by how computer-executable conditions testing for support of an image format are organized.

Referring still to FIG. 1, in the depicted embodiment, the lowest number represents the highest ranked image format (indicated by arrow 126) and the next lowest number 124 represents the highest ranked image format. The ranking criteria 122 provides a sequence for the image formats. Thus, the next highest ranked image format is subsequent in the sequence to the highest ranked image format 126. The ranking of the other image formats proceeds in like manner such that the highest number represents the lowest ranked image format. Of course, the highest ranked image format 126 may not be the same as the preferred image format 118. The ranking criteria 122 may rank the preferred image format 118 first, although this is not a requirement.

Other ranking criteria 122 may be used, including ranks 124 based on quality, average size for images in the image format, popularity, level of interactivity provided, web page developer preference, user preference or the like. In one embodiment, a developer of the dynamic web page 108 defines the ranking criteria 122. Alternatively, a user of the web browser may be allowed to define the ranking criteria 122.

While a numerical ranking criteria 122 is used in this specification for clarity, references to the "highest ranked image format," "next highest ranked image format," "preferred image format," and "next preferred image format" will be understood by those of skill in the art to refer to ranked image formats regardless of the ranking criteria 122 used whether numerical, alphabetical, or the like.

The image format request code 114 is programmed to request an image 128 according to the preferred image format 118. If the preferred image format 118 is not supported by the web browser 102, the image format request code 114 requests an image 128 in an image format that is ranked subsequent, and closest, to the preferred image format 118 in the set of image formats 120.

The web browser 102 integrates the computer-executable code 110 into the dynamic web page 108. The dynamic web page 108 is sent to the web browser 102. The web browser 102 includes a set of displayable image formats 130. The set of displayable image formats 130 are the image formats which are currently supported by the web browser 102.

The web browser 102 reads the web page 108 and executes the computer-executable code 110. Based on the set of displayable image formats 130 and other web browser configuration information (discussed in more detail in relation to FIG. 2), the computer-executable code 110 selects an image format from the set of displayable image formats 130. An indicator 132 of the image format selected (indicated by arrow 134) is included in the image request 116. If the preferred image format 118 is in the set of displayable image formats 130, the preferred image format 118 is selected 134.

Otherwise, the next image format, according to the ranking criteria 122, which is ranked subsequent to the preferred image format 118, is selected. Alternatively, the image format ranked next highest to the preferred image format 118 is selected. Generally, the image format ranked next highest may also be the next preferred image format.

Referring still to FIG. 1, suppose, the preferred image format 118 is Flash. However, the set of displayable image formats 130 does not include Flash. Among the set of displayable image formats 130, PNG and GIF are within the set of image formats 120. According to the ranking criteria 122, PNG has a rank of three and GIF has a rank of four. Therefore, the image format request code 114 generates an image request 116 which includes an indicator 132 set for the PNG format.

The image request 116 is preferably received by an image server 104. The image request 116 may include the address, such as a URL (Uniform Resource Locator), for the image server 104. As mentioned above, the image server 104 may be physically local or remote in relation to the web server 100. Preferably, the image server 104 processes the image request 116 and generates an image 128 in the format indicated by the indicator 132. The generated image 128 is sent to the web browser 102.

The web browser 102 displays the image 128 and any other elements of the dynamic web page 108. Preferably, the image 128 is interactive, meaning that the image 128 responds to actions of a user. The image 128 may include user interface controls (not shown), an image map, and/or other features which allow for interaction between a user and the image 128. Generally, these interactive elements, including image maps, are pre-generated along with the corresponding image 128 and included as part of the dynamic web page 108. Alternatively, in certain browsers 102, interactive elements such as image maps are loaded dynamically when the web page 108 is displayed.

For example, a region of the image 128 may change certain colors when a user passes a mouse cursor over the region. Similarly, passing the mouse cursor over the region may cause a pop-up window to display certain information. Alternatively, clicking a mouse over a certain portion may cause a new web page to display. Of course, there are various other interactive features which an image 128 may provide and which are well known to those of skill in the art.

Preferably, the image formats are ranked according to quality. While quality is subjective, the ranking may involve factors such as the visual quality of the image itself, the degree of interactive functionality provided by the image, and the like. Quality ranking may also involve the type of image format. For example, bitmapped images are different from vector based images. Generally, vector based image formats provide a higher quality image and are adaptable to different sizes for the display area for an image.

The dynamic web page 108 may include other image requests 116 which are generated in like manner to the one discussed above. Preferably, the image server 104 generates images 128 in image server formats 136 which correspond to those within the set of image formats 120. Alternatively, the image server 104 may generate images 128 in formats 136 which are a subset of the set of image formats 120.

Figure 2A:
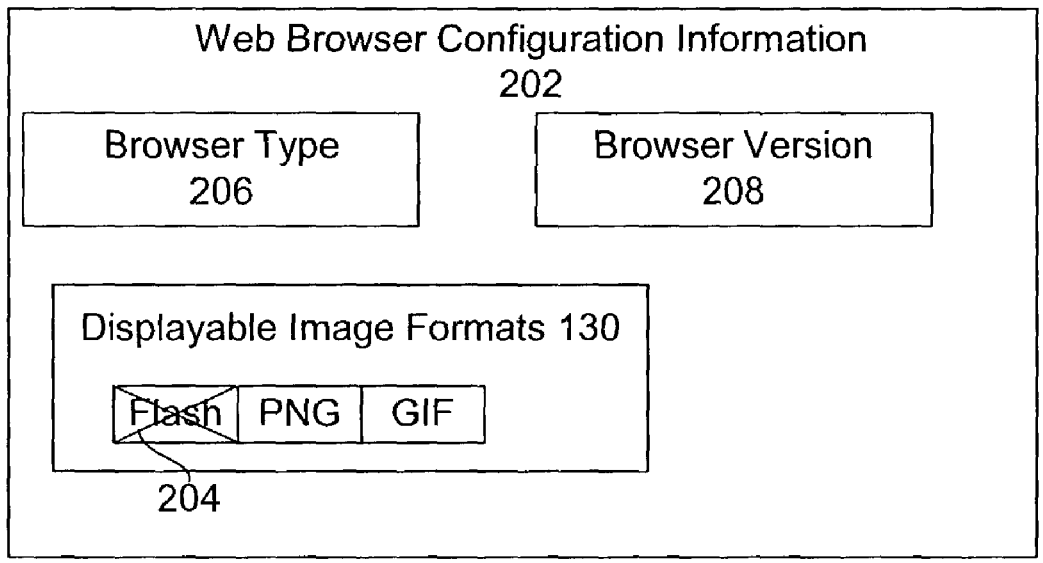
FIG. 2A is a block diagram illustrating data components for web browser configuration information used in one embodiment.

Referring now to FIG. 2A, a block diagram illustrates data components of web browser configuration information 202. As discussed above, the web browser configuration information 202 is information gathered by the computer-executable code 110 (See FIG. 1) integrated with a dynamic web page 108 (See FIG. 1). As mentioned, a developer of a web page 108 which includes images 128 (See FIG. 1), both interactive and non-interactive, does not know what kind of web browser 102 (See FIG. 1) a user may be using to view the web page 108.

Preferably, the web browser configuration information 202 includes the set of displayable image formats 130 (See FIG. 1). In one embodiment, the set of displayable image formats 130 is determined by configuration information made available by the web browser 102. The browser 102 may allow computer-executable code 110 to evaluate properties and attributes of the browser 102. Certain properties may include a list or array of image formats supported by the web browser 102. For example, basic image formats supported may be listed in an array made available as a property of the browser 102.

Other displayable image formats 130 are supported in a browser 102 through use of plug-ins. Plug-ins are well known. Plug-ins may be installed or uninstalled as needed to extend the functionality of the browser 102.

Most browsers 102 allow computer-executable code 110 to query the browser 102 to determine which plug-ins are installed. The browser 102 may provide access to an array or other data structure which indicates installed plug-ins. The array may comprise software objects which provide the features and functions for the plug-ins installed on the browser 102. By checking for the existence of the software object, the installation of the plug-in can be verified.

By comparing the plug-ins installed with the plug-ins required to support the image formats of the set of image formats 120 (See FIG. 1), the browser detection code 112 (See FIG. 1) determines which image formats are supported and which are not. Preferably, the browser detection code 112 begins by querying for the plug-in associated with the highest ranked image format 126 (See FIG. 1). If the associated plug-in is not installed, the browser detection code 112 queries for the plug-in associated with the next highest ranked image format. This querying process may continue until each of the image formats in the set 102 has been evaluated. Alternatively, the querying process may stop once a plug-in for the preferred image format 118 (See FIG. 1) is identified as installed in the browser 102. As each plug-in installed is identified, the browser detection code 112 may set a boolean variable for use by the image format request code 114 (See FIG. 1) to request an image 128 of the appropriate format.

Conventionally, although a plug-in is installed, the plug-in may not be enabled. A user may intentionally disable the plug-in. The user may disable a plug-in for security reasons, bandwidth reasons, or the like. In FIG. 2A, the "X" 204 over the "Flash" format illustrates that the flash plug-in is installed but has been disabled. Alternatively, the browser 102 may disable a plug-in due to security settings, anti-virus precautions, plug-ins which repeatedly causes errors, or the like.

Therefore, the browser detection code 112 may include code for determining that installed plug-ins are also enabled. This may be done by using a simple attribute test condition for a software object implementing the plug-in. Of course, enabled plug-ins may also be represented and detected using various other methods.

Of course, web browser configuration information 202 may include other information beyond that illustrated in FIG. 2A. In certain embodiments, other web browser configuration information 202 may be evaluated to determine which image formats are supported. For example, the browser type 206 and browser version 208 may be evaluated.

A browser type 206 is an indicator of the type of browser. For example, browser types 206 include Internet Explorer, Netscape, Opera, Mozilla, and the like. A browser version 208 is generally the version number associated with the browser 102. Version numbers generally indicate how many major and minor versions of software have been released. Typically, version numbers increase as a software application ages and matures.

As new image formats are introduced and adopted, a quick check of the browser type 206 and/or browser version 208 may be sufficient to determine whether an image format is supported. Certain browser types 206 and browser versions 208 are known to support certain image formats. For example, all Internet Explorer browsers having a version of 4.01 and Netscape browsers having a version of 4.0 or greater are known to support the PNG image format. Thus, the browser detection code 112 may evaluate the browser type 206 and/or browser version 208 alone to determine whether certain image formats are supported.

Figure 2B:
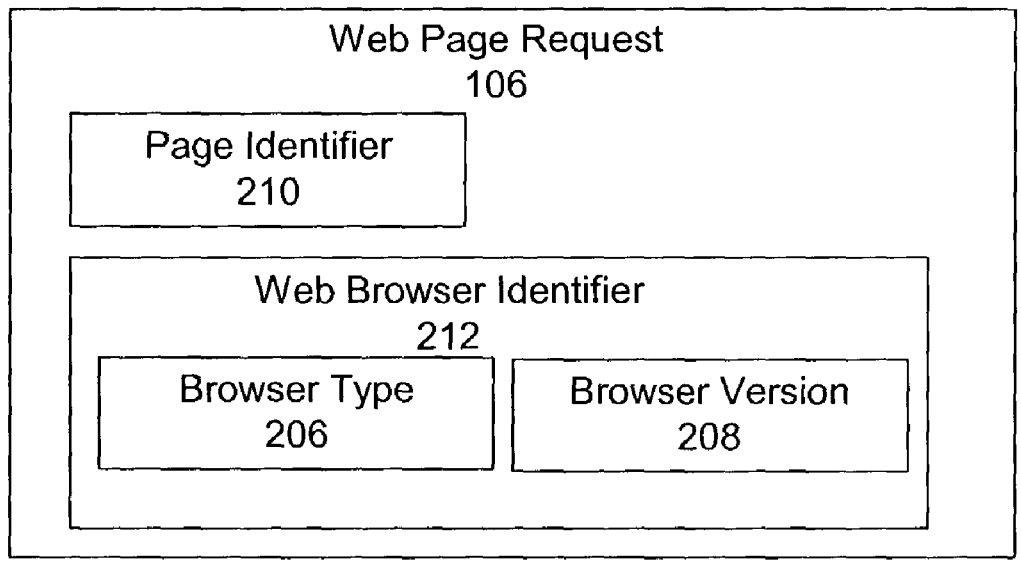
FIG. 2B is a block diagram illustrating data components for a web page request used in one embodiment.

Referring now to FIG. 2B, components of a web page request 106 are illustrated. Generally, a web page request 106 includes a page identifier 210 and a web browser identifier 212. The page identifier 210 is a URL which includes an address for the web server 100 (See FIG. 1) and an identifier of the script file (See FIG. 7) on the web server 100 to be executed. Alternatively, the page identifier 210 may indicate an application executing on the web server 100 configured to service the web page request 106.

The browser identifier 212 is generally a string which includes text identifying the browser type 206 and browser version 208. This string is known as a UserAgent string. An example of a UserAgent string follows: "Mozilla/4.0 (compatible; MSIE 6.0; Windows 98; Q312461)." In this example, "Mozilla" is the browser type 206 and "4.0" is the browser version 208. Of course, the different types and versions of web browsers 102 (See FIG. 1) may provide a different User-Agent strings. However, by evaluating the UserAgent string the browser detection code 112 (See FIG. 1) may determine which image formats are supported by default for a particular browser 102.

Figure 7:
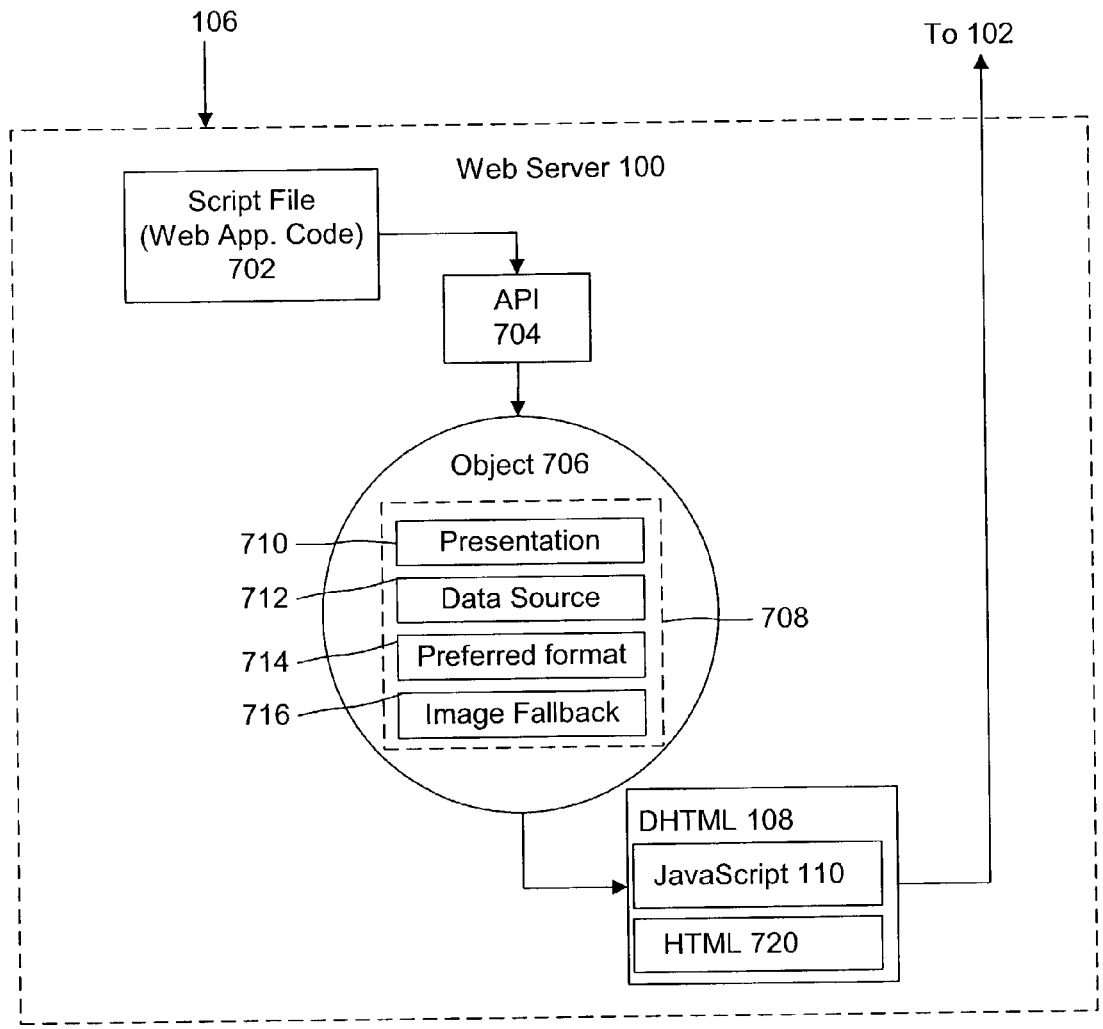
FIG. 7 is a block diagram of one embodiment of the present invention which provides an application programming interface which allows a web page developer to develop web pages which automatically display in the most preferred image format supported and enabled for a particular web browser.

Referring now generally for FIGS. 1, 2A, and 2B, in a preferred embodiment, the web page request 106 causes the web server 100 to execute a script file (See FIG. 7). The script file includes computer code written by a developer to generate a desired dynamic web page 108. Preferably, the script file includes instructions (not shown) which determine how rigorously the browser detection code 112 evaluates the features and capabilities of the requesting browser 102.

Preferably, the script file instructions include an image fallback identifier (not shown). An image fallback identifier is a variable which is set in the script file. The computer executable code 110 generated may vary based on the value of the image fallback identifier.

In one embodiment, the image fallback identifier may be set to the values of "STRICT," "LOOSE," or "NONE." If the value is "STRICT," the browser detection code 112 will attempt a plurality of means to determine which image formats are supported and enabled in the requesting web browser

102. In addition, if the value is "STRICT," the image format request code 114 is generated to ensure that an image format supported by the browser 102 is requested. Thus, an image is essentially guaranteed to be displayed.

Furthermore, the image format request code 114 includes conditions and other code to ensure that either the preferred image format 118 is requested, or that the image format ranked subsequent and closest to the preferred image format 118 is requested, as discussed above. In other words, where the image formats are ranked based on quality of the image format with the highest ranking being the highest quality, setting the image fallback identifier to "STRICT" ensures that the image of the web page 108 will be displayed and that the quality of the image displayed will be the best quality supported and enabled by a user's web browser 102.

In addition, a developer may set the image fallback identifier to "LOOSE." In this case, the browser detection code 112 generated will make a less rigorous attempt to determine which image formats are supported and enabled in the requesting web browser 102 than if the image fallback identifier were set to "STRICT." Instead, the browser detection code 112 will determine certain web browser configuration information 202, after which the code 112 will anticipate the displayable image formats 130. For example, the code 112 may simply process the browser identifier 212. Based on the browser type 206 and/or browser version 208, the code 112 will anticipate that the browser 102 supports the preferred image format 118.

Thus, the image format request code 114 may request an image 128 in the preferred image format 118. If the browser detection code 112 incorrectly anticipated that the preferred image format 118 is supported, the image request 116 may result in a broken image icon rather than the intended image 128. Alternatively, if the image 128 is not supported, the image format request code 114 may include a request to download a plug-in or other software module to support the preferred image format 118 or highest ranked image format 126. However, if the user interrupts or refuses to install the necessary plug-in or software, a broken image icon may be displayed.

If a developer sets the image fallback identifier to "NONE," no computer-executable code 110 is generated and the dynamic web page 108 is sent to the web browser 102. In this case, the dynamic web page 108 will request images in the image format specified in the dynamic web page 108, rather than having the requested image formats modified by the computer-executable code 110. If the image formats are unsupported, a user may get an error message, an offer to download a necessary plug-in, or a broken image icon.

Figure 3:
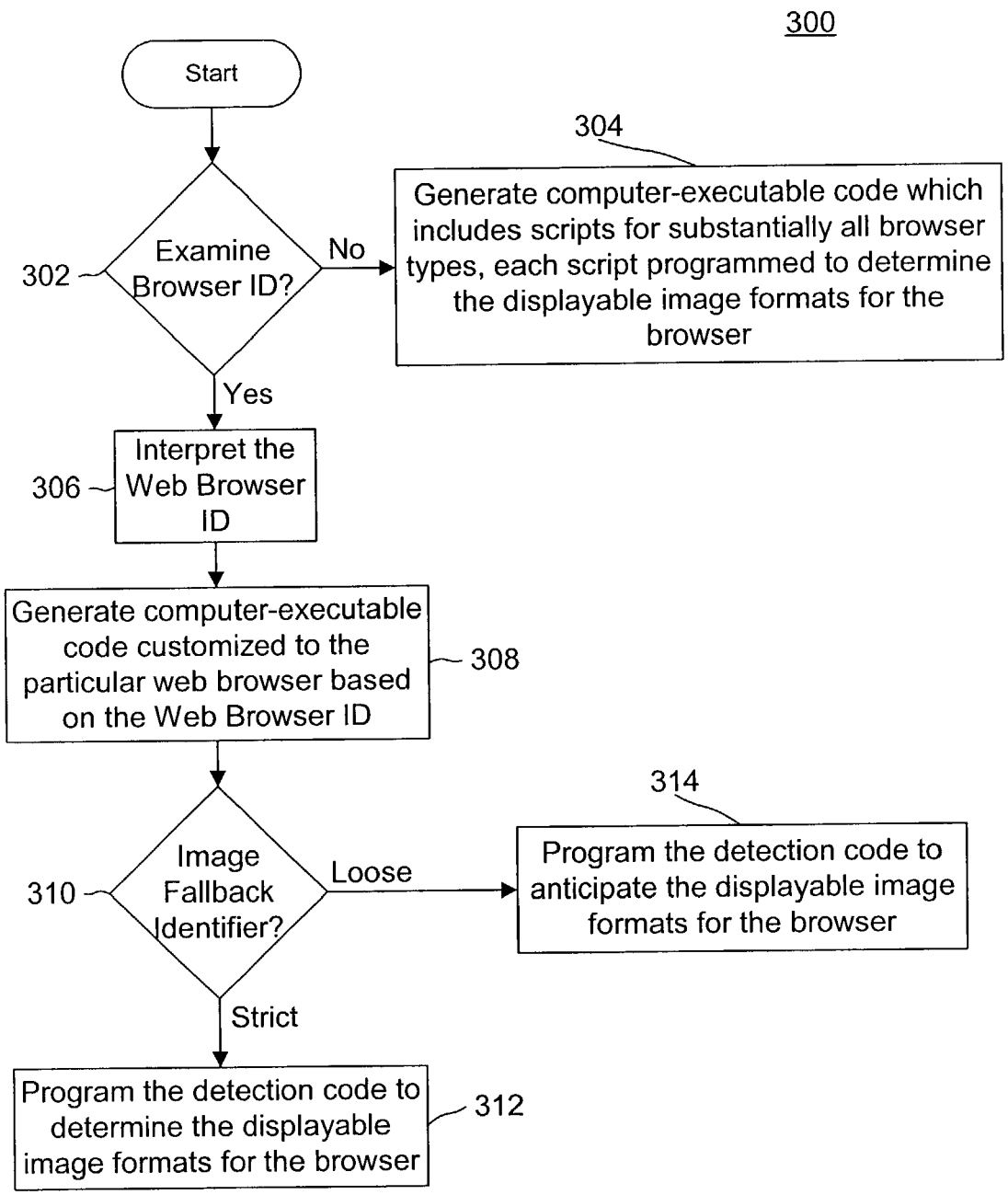
FIG. 3 is a flowchart of a method for generating computer-executable code based on a request from a particular web browser.

Referring now generally to FIGS. 1, 2A and 2B and specifically to FIG. 3, a flowchart of a method 300 for generating computer-executable code 110 based on a request 106 from a particular web browser 102 is illustrated. As mentioned above, certain web browsers 102 only support a particular format of computer-executable code 110, others only support certain aspects of a particular format, and still others do not support any computer-executable code 110.

For example, an Internet Explorer browser 102 does not fully support computer-executable code 110 written in JavaScript which is supported by most other types of browsers 102. The Internet Explorer browsers 102 fully support JScript or VBScript. However, accurate plug-in detection requires the use of VBScript. Thus, to accurately determine the displayable image formats 130, such as plug-ins, the computer-executable code 110 should be written in VBScript. Other browsers 102 may be configured to ignore computer-executable code 110. Alternatively, the feature allowing for execution of computer-executable code 110 may be intentionally disabled by a user.

Therefore, to accommodate these differences the method 300 is provided. Generally, the method 300 is implemented in a script file (See FIG. 7) executed in response to a web page request 106. First, a determination 302 is made whether to examine the browser identifier 212 provided in the request 106. If not, a plurality of computer-executable code 110 sets are generated 304. A computer-executable code 110 set may be generated for substantially each type of web browser 102. For example, computer-executable code 110 may be generated in JavaScript, VBScript, and in plain HTML such that regardless of the type of browser 102 some form of supported computer-executable code 110 is provided.

If the browser 102 is to examine the browser identifier 212, the next step 306 is to interpret the browser identifier 212. As discussed above, generally interpretation of the browser identifier 212 identifies the browser type 206 and/or browser version 208. Based on the browser type 206 and/or version 208, the web server 100 may generate 308 computer-executable code 110 specific to the type of browser 102. For example, where the browser type 206 is Internet Explorer, a single set of computer-executable code 110 in VBScript may be generated.

Next, in certain embodiments, the image fallback identifier is evaluated 310. If the image fallback identifier is "STRICT," browser detection code 112 is generated 312 which uses one or more conditions to determine the set of displayable image formats 130 for the browser 102. Alternatively, if the image fallback identifier is "LOOSE," browser detection code 112 is generated 314 which anticipates the set of displayable image formats 130 for the browser 102, based principally on the web browser identifier 212.

Figure 4:
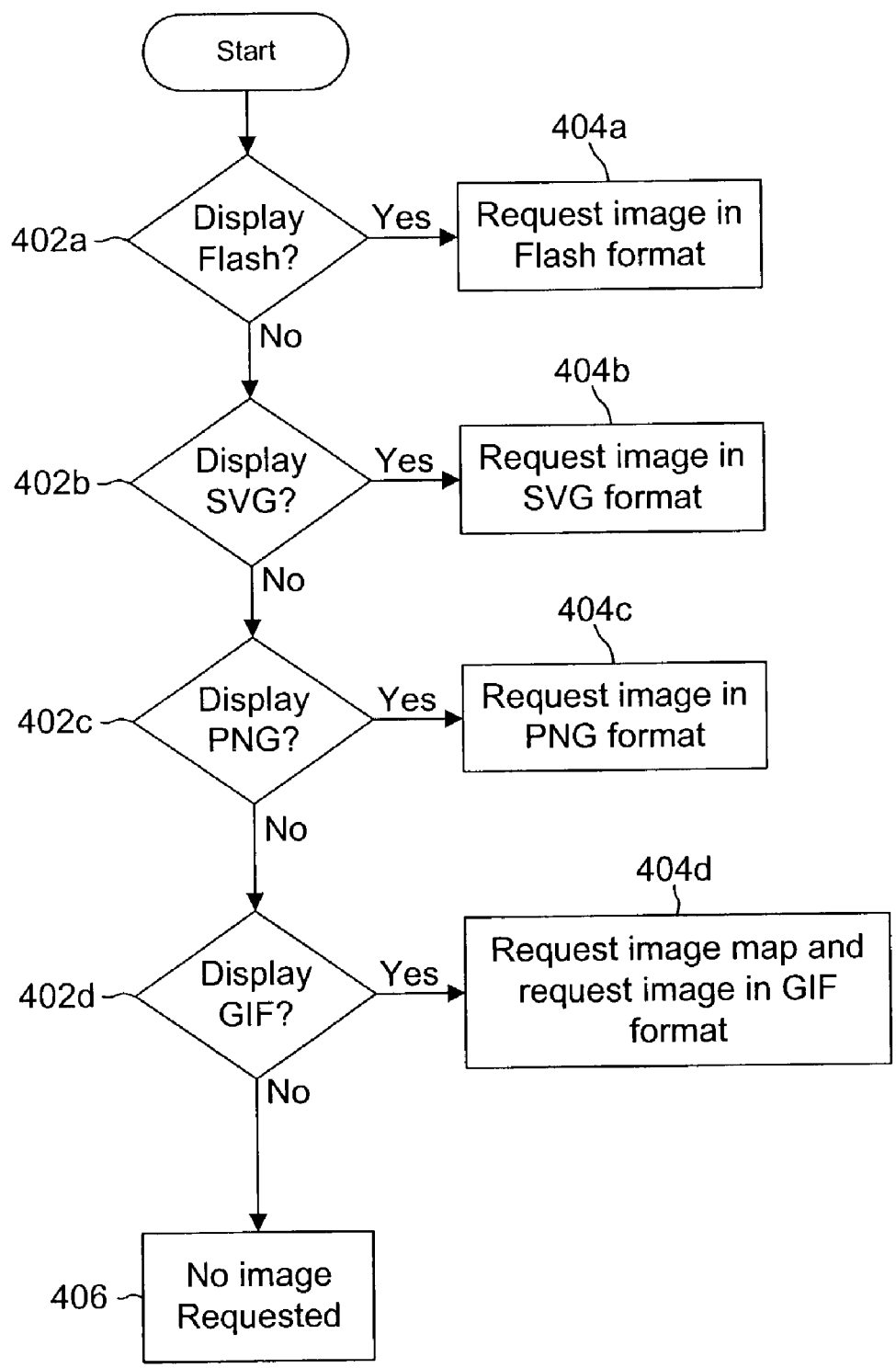
FIG. 4 is a flowchart of a method for requesting an image in the supported, enabled, and most preferred image format according to one embodiment of the present invention.

Referring now generally to FIGS. 1, 2A and 2B and specifically to FIG. 4, a flowchart of a method 400 for requesting a supported image format is illustrated. Preferably, this method 400 is implemented in the image format request code 114. The image format request code 114 uses web browser configuration information 202 to make determinations in the method 400. As discussed above, browser type 206, browser version 208, the set of displayable image formats 130 or some combination of these may be used.

In one embodiment, the method 400 implements a series of conditions 402. The conditions 402 may be ordered according to the rank criteria 122. Thus, condition 402a is evaluated to determine whether the highest ranked 126 or most preferred image format is supported. If the condition 402 evaluates to true, the dynamic web page 108 is modified to request 404 an image 128 in the image format corresponding the condition 402 executed and the method 400 stops. If the condition 402a-d evaluates to false, one or more subsequent conditions 402 are evaluated. If a condition 402a-d evaluates to true, the corresponding image format is requested 404a-d and the method 400 stops. For example, referring generally to FIGS. 1 and 4, conditions 402a-d check to determine if image formats Flash, SVG, PNG and GIF are supported. The order of the conditions 402a-d corresponds to the order of the set of image formats 120 ranked by ranking criteria 122. If each of the conditions 402 evaluates to false, no image is requested 406 and a broken image icon is displayed. Generally, one of the conditions 402a-d will evaluate to true.

For example, most browsers 102 support the GIF format. Therefore, the "Display GIF" condition 402d evaluates to true and a GIF image is requested 404d. In certain embodiments, an image map (not shown) corresponding to the GIF image may be requested. An image map is well known in the art and provides limited interactivity when coupled with an image such as a GIF image. Thus, a GIF image coupled with an image map provides more interactivity than the GIF image alone. Of course, image maps may also be used with other formats such as JPEG, PNG, and the like.

Figure 5:
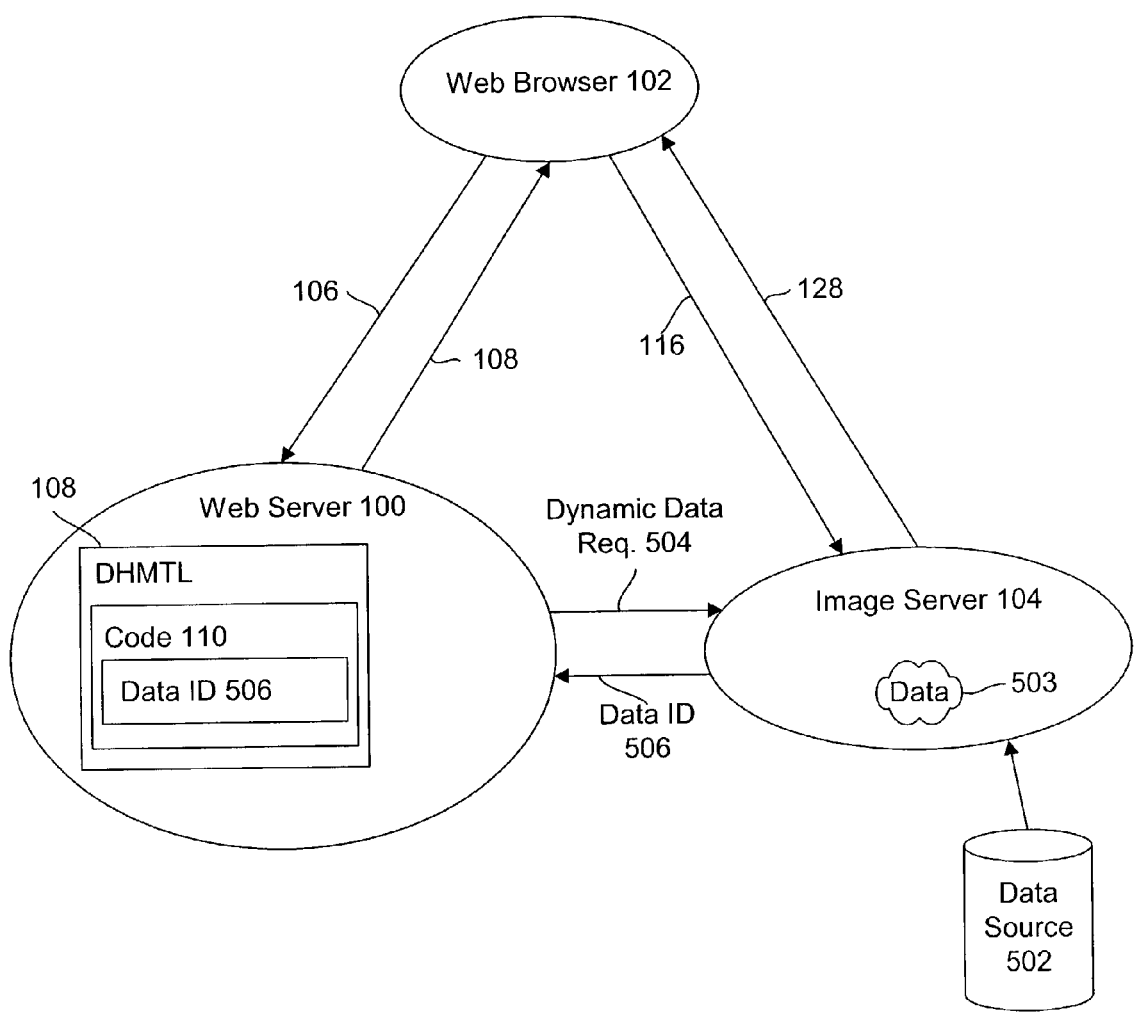
FIG. 5 is a block diagram of components of a method for dynamically generating an image for a dynamic web page which is in a format which is supported, enabled, and most preferred for a particular web page.

Referring now to FIG. 5, a block diagram illustrates components of an alternative embodiment of the present invention. The embodiment of FIG. 5 performs substantially the same steps and includes similar process flow to that described in relation to FIG. 1. However, once a web server 100 receives a web page request 106, additional steps may be performed as illustrated in FIG. 5.

Conventionally, images 128 are being generated on-the-fly from dynamic data sources 502. A dynamic data source 502 refers to virtually any data source which is loaded and used as needed and changes with some regularity. Dynamic data sources 502 may be used due to the frequency of changes to the data. Alternatively, the size and configuration of the data may allow for such a high number of images 128 which may be produced that pre-generating and storing these images 128 is either inefficient or impractical. A dynamic data source 502 may include a database, a data file, an XML file, a web service, and the like.

Once the web server 100 receives the web page request 106 and the dynamic web page 108 includes images 128 produced from one or more dynamic data sources 502, the web server 100 communicates a dynamic data request 504 to an image server 104 for production of the image(s) 128. In response, the image server 104 caches data 503 from the dynamic data source 502. The image server 104 then sends a data identifier 506 back to the web server 100. The data identifier 506 associates the cached data 503 with the image 128 which will be requested and generated later.

In certain embodiments, the dynamic data request 504 includes an image fallback identifier (not shown). Based on the image fallback identifier, the image server 104 may also generate an image map (not shown). The image map is preferably also associated with the data identifier 506. If the fallback identifier is "STRICT", an image map may automatically be generated by the image server 104. If the fallback identifier is "LOOSE", an image map may still be generated by the image server 104 in anticipation that the image map will be needed when the image 128 is requested.

The web server 100 receives the data identifier 506. Preferably, the data identifier 506 is incorporated into the computer-executable code 110 being generated. Specifically, the data identifier 506 is integrated with the image format request code 114. Thus, image requests 116 for the dynamically generated images 128 from dynamic data sources 502 include the data identifier 506. When the image server 104 receives the image request 116 including the data identifier 506, the image 128 is quickly generated because the data 503 is already cached in the image server 104.

Figure 6:
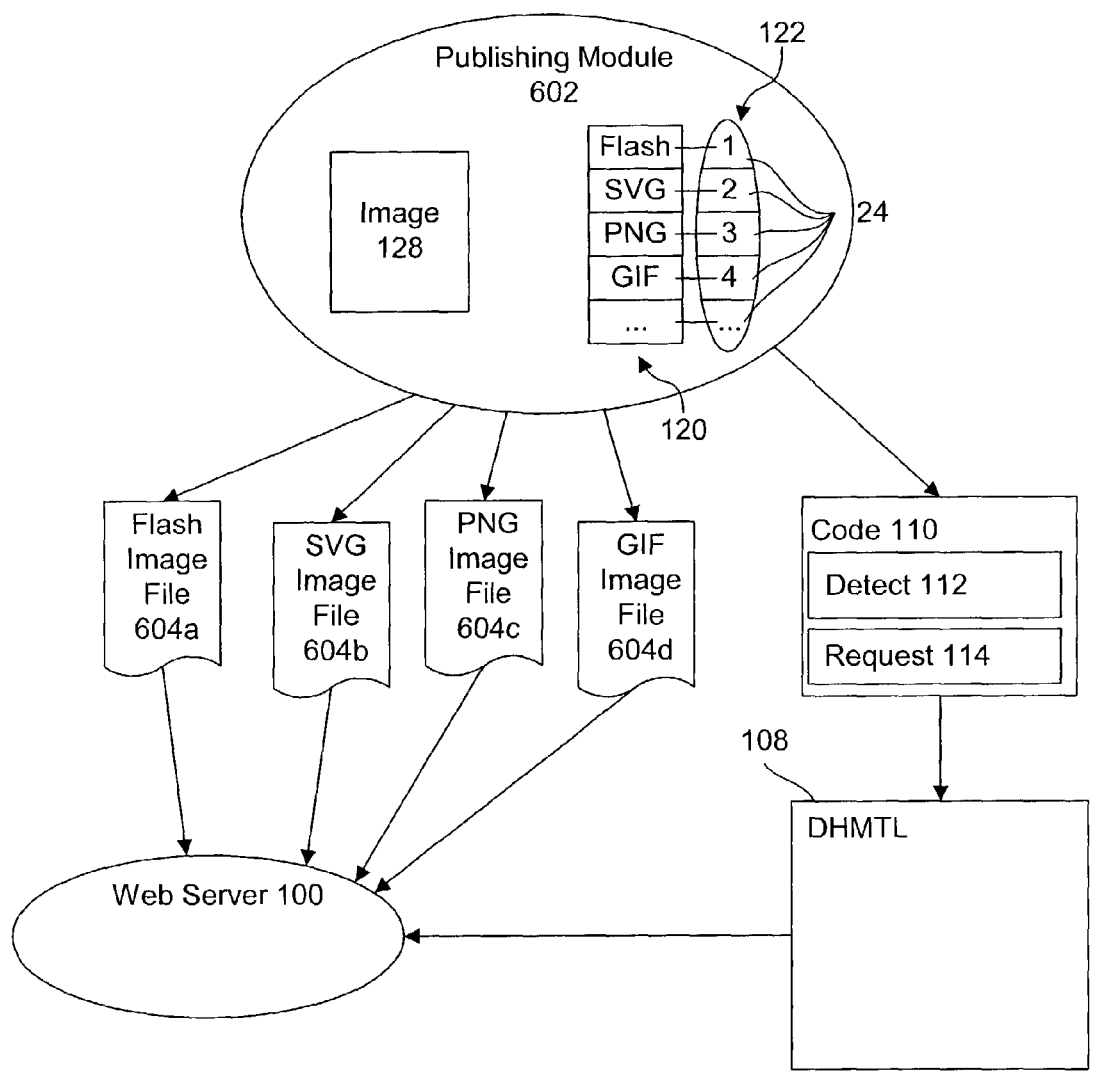
FIG. 6 is a block diagram of one embodiment of the present invention for publishing static images for a web page in the formats which may be requested by different web browsers which support and enable various image formats.

FIG. 6 illustrates components of an alternative embodiment of the present invention. Preferably, images 128 (See FIG. 1) are generated in a desired image format as needed. Alternatively, the images 128 are generated for a set of image formats prior to making the dynamic web page 108 accessible.

A publishing module 602 allows a user to design, edit, and modify an image 128. The image 128 may be stored for later use in a variety of formats including Flash, SVG, PNG, GIF, and the like. The publishing module 602 includes a set of image formats 120. As in FIG. 1, publishing module 602 includes ranking criteria 122 associating a rank 124 with each image format.

Once, the image 128 is prepared for publication on a web server 100, the user may initiate a publication process. According to the publication process, the set of image formats 120 is accessed by the publishing module 602. Next, the publishing module 602 generates an image file 604 which stores a digital representation of the image 128. Preferably, a separate image file 604a-d is generated to represent the image 128 according to each of the image formats in the set of ranked image formats 120.

Next, computer-executable code 110 for determining a user's web browser configuration information 202 (See FIG. 2A) is generated. The computer-executable code 110 is programmed to select one of the image files 604a-d according to the ranking criteria 122 and web browser configuration information 202. This computer-executable code 110 operates in similar manner to that discussed in relation to FIG. 1, except that rather than requesting an image 128 be generated, an image file 604 is requested.

In addition, a plurality of computer-executable code 110 sets are generated because without a web page request 106 the type of web browser 102 which will make a request is undetermined. Generally, a computer-executable code 110 set is generated for substantially all of the types of web browsers 102.

Finally, the computer-executable code 110 is integrated into a web page 108 within which a developer desires to include the image 128 found in the file 604a-d. The web page 108 along with each of the image files 604a-d are stored on the web server 100. Now, when the web page 108 is accessed, a user's web browser 102 is evaluated to determine which image formats are supported. The web page 108 is modified to request images according the ranked image formats. The image requests 116 (See FIG. 1) simply cause an image file 604a-d of a corresponding supported and selected image format to be retrieved for display.

Referring now to FIG. 7, in a preferred embodiment, the web page request 106 requests a dynamic web page 108 by causing the web server 100 to execute a script file 702. The script file includes computer code written by a developer to generate a desired dynamic web page 108. Preferably, the script file 702 includes instructions which invoke functions of an API 704 (application programming interface).

The API 704 is a library of functions which a developer may invoke to accomplish different tasks relating to integrating of an image 128 (See FIG. 1) in a web page 108. The API 704 provides the functionality to produce the computer-executable code 110 for detecting a web browser's configuration information (See FIG. 2A) and displaying images in a supported image format. The image format being selected according to ranking criteria.

The API 704 is preferably computer object code. The API 704 may be written in various computer programming languages and/or scripting languages including Java, JavaScript, COM (Component Object Model), .NET, PHP (PHP Hypertext Preprocessor), PERL (Practical Extraction and Reporting Language), C, C#, VB (Visual Basic), Cold Fusion, C++, and the like. In one embodiment, the API 704 is used to create a software object 706. The software object 706 itself may include functionality for generating the computer-executable code 110 discussed above. Alternatively, the software object 706 may communicate with an image server 104 (See FIG. 1) which generates and returns the computer-executable code 110. Of course, while an image server 104 may be used in certain embodiments, those of skill in the art recognize that the software object 706 may communicate with practically any software module (remote or local) which is programmed to generate and return the computer-executable code 110.

The software object 706 is an object comprising attributes and methods for representing an actual or virtual object. Software objects 706 are well known in the art. Instructions in the script file 702 call functions of the API 704 to define an instance of the software object 706. Essentially any number of instances of a software object 706 may be created. Each instance may include different attribute 708 values. The process of defining a new instance of a software object 706 is referred to as instantiating a software object 706.

Generally, a new instance of a software object 706 is associated with a variable in the script file 702. Attributes may be set and methods may be invoked by reference to this variable. The setting of these attributes and calling of the methods is referred to as configuring the software object 706. Instructions for configuring the software object 706 are in the script file 702. Configuring the software object 702 allows a developer to control the "look and feel," level of interactivity, a set of data used for the image 128 (See FIG. 1), or the like.

In one embodiment, a developer (not shown) may set a presentation attribute 710. The presentation attribute 710 defines a template which will be used for generating an image 128. A data source 712 may also be set. The data source 712 defines where data, either static or dynamic, is located for use in generating an image 128. Setting the presentation attribute 710 and data source 712 configures the software object 706 for use by an image server 104 (See FIG. 1) to provide a customized image (not shown).

A preferred format attribute 714 identifies the preferred image format 118 (See FIG. 1) for the image 128. Setting the preferred format attribute 714 configures the software object 706 to use an image format from among the set of image formats 120 (See FIG. 1).

An image fallback attribute 716 may also be set. An image fallback attribute 716 defines the image fallback identifier as described above in relation to FIGS. 1, 2A, and 2B. Of course, other attributes may exist depending on the definition of the software object 706.

Once the software object 706 is configured, a function of the API 704 may be called. The function may use the software object 706 and the web browser identifier 212 (See FIG. 2) to generate browser-specific executable code 110. Browser-specific executable code 110 (See FIG. 1) may be substantially the same as the computer-executable code 110 discussed in relation to FIG. 1. However, the browser-specific executable code 110 may include code which is specific to the type of web browser 102 which made the web page request 106.

As discussed in relation to FIG. 1, the browser-specific executable code 110 is programmed such that when the preferred image format 118 (See FIG. 1) is unsupported, a supported image format ranked next highest to the preferred image format 118 is automatically selected. The browser-specific executable code 110 further includes code to request the image 128 from an image server 104 (See FIG. 1) in the selected image format 136 (See FIG. 1).

The browser-specific executable code 110 may be combined with other HTML code 720 for the dynamic web page 108. The dynamic web page 108 is then sent back to the web browser 102. Of course, a single web page 108 may include multiple images in various formats.

Generally, the developer wants to impress the user and avoid disappointing a user with images which do not display, do not display properly, or are displayed in a poor quality format. The present invention allows a developer to develop the web page 108 with assurance that the computer-executable code 110 will request an image 128 (See FIG. 1) which is closest in ranking to the preferred image format 118 (See FIG. 1). The code required to provide this assurance may be automatically generated and determined for a developer based on configuring a few attributes of the software object 706 (See FIG. 7). These benefits increase the efficiency and quality of web pages 108 (See FIG. 1) developed by a developer.

Based on the foregoing, the present invention offers a number of advantages not available in conventional approaches. The present invention allows a developer to develop one version of a web page which includes computer-executable code that ensures that the most preferred image format is used to display images of a web page without using redirection. In addition, the present invention automatically determines whether the most preferred image format is supported and enabled in a particular user's web browser and requests images in the next most preferred image format without any additional code written by the web page developer. The system and method provides an application programming interface which allows a web page developer to implement the system and method using a minimal amount of computer-executable code.

While specific embodiments and applications of the present invention have been illustrated and described, it is to be understood that the invention is not limited to the precise configuration and components disclosed herein. Various modifications, changes, and variations apparent to those skilled in the art may be made in the arrangement, operation, and details of the methods and systems of the present invention disclosed herein without departing from the spirit and scope of the invention.

What is claimed is:

1. A method for dynamically publishing an image in a web page accessible to a variety of web browsers, the method comprising:
   in response to a request from a web browser for a dynamic web page which includes the image in one or more image formats, integrating computer-executable code with the dynamic web page, the computer-executable code being programmed to determine web browser configuration information and to request an image according to a set of image formats which are ranked according to ranking criteria predetermined to rank the image formats in order of preference and the web browser configuration information;
   sending the dynamic web page to the web browser;
   receiving an image request from the web browser which executes the computer-executable code, the image request comprising an indicator of the image format selected according to the web browser configuration information and the ranking criteria;
   generating the requested image according to the indicated image format and sending the requested image to the web browser for display.

2. The method of claim 1, wherein the image request comprises an indicator of the image format selected according to ranking criteria and the web browser configuration information.

3. The method of claim 1, wherein in response to the web browser configuration information indicating that the highest ranked image format is not displayable by the web browser, the computer-executable code is programmed to request the image according to an image format which the web browser configuration information indicates is displayable and which is ranked subsequent to the highest ranked image format within the ranked set of image formats according to the ranking criteria.

4. The method of claim 1, wherein in response to the web browser configuration information indicating that the highest ranked image format is not displayable by the web browser, the computer-executable code is programmed to request the image according to an image format which the web browser configuration information indicates is displayable and which is ranked next highest to the highest ranked image format within the ranked set of image formats according to the ranking criteria.

5. The method of claim 1, wherein integrating computer-executable code comprises:
generating computer-executable detection code to detect web browser configuration information, the web browser configuration information including the image formats displayable by the web browser; and
generating computer-executable code to request the image according to the highest ranked image format which is displayable in the web browser according to the web browser configuration information and the ranking criteria.

6. The method of claim 5, wherein according to an image fallback identifier, generating computer-executable detection code comprises generating computer-executable scripts for substantially all types of web browsers, each script being programmed to determine the displayable image formats for the browser.

7. The method of claim 5, wherein according to an image fallback identifier, generating computer-executable detection code comprises:
interpreting a web browser identifier; and
generating computer-executable detection code customized to the particular web browser based on the web browser identifier, the computer-executable detection code being programmed to determine the displayable image formats for the browser.

8. The method of claim 5, wherein according to an image fallback identifier, generating computer-executable detection code comprises:
interpreting a web browser identifier; and
generating computer-executable detection code customized to the particular web browser based on the web browser identifier, the computer-executable detection code being programmed to anticipate the displayable image formats for the browser.

9. The method of claim 5, wherein the computer-executable code to request the image is programmed to download and install a software module to support the highest ranked image format when the highest ranked image format is currently unsupported in the web browser.

10. The method of claim 1, wherein the ranking criteria is defined by a developer of the dynamic web page.

11. The method of claim 1, further comprising:
communicating with an image server to produce the requested image using a dynamic data source;
receiving an identifier of data associated with the dynamic data source which the image server has pre-cached; and
incorporating the identifier in computer-executable code for requesting the image such that the pre-cached data is retrieved to generate the image.

12. The method of claim 1, wherein the image is an interactive image.

13. A method for developing web pages which automatically displays images in a user's web browser according to a highest ranked image format in a set of ranked image formats, the method comprising:
providing an application programming interface for detecting a web browser's configuration information and displaying images in an image format selected from a set of one or more ranked image formats, the selected image format being supported by the web browser configuration information and selected according to ranking criteria predetermined to rank the image formats in order of preference;
calling one or more application interface functions for integrating a customized image into a dynamically generated web page and designating an image format from the set of ranked image formats as a preferred image format;
calling an application programming interface function for automatically generating browser-specific executable code for determining whether a user's web browser supports the preferred image format designated; and
wherein browser-specific executable code is programmed such that when the preferred image format is unsupported, a supported image format ranked next highest to the preferred image format is automatically selected and the image is requested from the image server in the supported image format which is ranked next highest to the preferred image format.

14. The method of claim 13, further comprising:
instantiating a software object by calling functions of the application programming interface;
configuring the software object for use by an image server to provide the customized image; and
configuring the software object to designate an image format from the set of ranked image formats as the preferred image format.

15. The method of claim 13, wherein the application programming interface is written in a programming language selected from the group comprising Java, JavaScript, COM, .NET, PHP, PERL, C, C#, VB, Cold Fusion, and C++.

16. A method for dynamically publishing an image in a web page accessible to a variety of web browsers, the method comprising:
in response to a request from a web browser for a dynamic web page which includes the image in one or more image formats, determining web browser configuration information from the request;
integrating computer-executable code with the dynamic web page, the computer-executable code being programmed to request an image according to a set of image formats which are ranked according to ranking criteria predetermined to rank the image formats in order of preference and the web browser configuration information;
sending the dynamic web page to the web browser;
receiving an image request from the web browser which executes the computer-executable code, the image request comprising an indicator of the image format selected according to the web browser configuration information and ranking criteria;
generating the requested image according to the indicated image format and sending the requested image to the web browser for display.

17. The method of claim 16, wherein the computer-executable code is further programmed to request the image based on an image fallback identifier associated with the request.

18. A computer-readable medium stored/embedded instructions for dynamically publishing an image in a web page accessible to a variety of web browsers, wherein the instructions comprise executable instructions for implementing a method comprised of the steps of:
in response to a request from a web browser for a dynamic web page which includes the image in one or more image formats, integrating computer-executable code with the dynamic web page, the computer-executable code being programmed to determine web browser configuration information and to request an image according to a set of image formats which are ranked according to ranking criteria predetermined to rank the image formats in order of preference and the web browser configuration information;

sending the dynamic web page to the web browser;

receiving an image request from the web browser which executes the computer-executable code, the image request comprising an indicator of the image format selected according to the web browser configuration information;

generating the requested image according to the indicated image format and sending the requested image to the web browser for display.

19. The computer-readable medium of claim 18, wherein the method step of integrating computer-executable code further comprises:

generating computer-executable detection code to detect web browser configuration information, the web browser configuration information including the image formats displayable by the web browser; and generating computer-executable code to request the image according to a highest ranked image format which is displayable in the web browser according to the web browser configuration information.

20. The computer-readable medium of claim 18, wherein in response to the web browser configuration information indicating that the highest ranked image format is not displayable by the web browser, the computer-executable code is programmed to request the image according to an image format which the web browser configuration information indicates is displayable and which is ranked subsequent to the highest ranked image format within the ranked set of image formats according to the ranking criteria.

21. The computer-readable medium of claim 18, wherein in response to the web browser configuration information indicating that the highest ranked image format is not displayable by the web browser, the computer-executable code is programmed to request the image according to an image format which the web browser configuration information indicates is displayable and which is ranked next highest to the highest ranked image format within the ranked set of image formats according to the ranking criteria.

22. The computer-readable medium of claim 18, wherein according to an image fallback identifier, the method step of generating computer-executable detection code further comprises:

interpreting a web browser identifier; and generating computer-executable detection code customized to the particular web browser based on the web browser identifier, the computer-executable detection code being programmed to determine the displayable image formats for the browser.

23. The computer-readable medium of claim 18, wherein according to an image fallback identifier, the method step of generating computer-executable detection code further comprises:

interpreting a web browser identifier; and generating computer-executable detection code customized to the particular web browser based on the web browser identifier, the computer-executable detection code being programmed to anticipate the displayable image formats for the browser.

24. The computer-readable medium of claim 18, wherein the method further comprises:

communicating with an image server to produce the requested image using a dynamic data source;

receiving an identifier of data associated with the dynamic data source which the image server has pre-cached; and incorporating the identifier in computer-executable code for requesting the image such that the pre-cached data is retrieved to generate the image.

25. A computer-readable medium containing stored/embedded instructions for developing web pages which automatically display images in a user's web browser according to a highest ranked image format in a set of ranked image formats, wherein the instructions comprise executable instructions for implementing a method comprising:

providing an application programming interface for detecting a web browser's configuration information and displaying images in an image format selected from a set of ranked image formats, the selected image format being supported by the web browser configuration information and selected according to ranking criteria predetermined to rank the image formats in order of preference;

calling one or more application interface functions for integrating a customized image into a dynamically generated web page and designating an image format from the set of ranked image formats as a preferred image format;

calling an application programming interface function for automatically generating browser-specific executable code for determining whether a user's web browser supports the preferred image format designated; and wherein browser-specific executable code is programmed such that when the preferred image format is unsupported, a supported image format ranked next highest to the preferred image format is automatically selected and the image is requested from an image server in the supported image format which is ranked next highest to the preferred image format.

26. The computer-readable medium of claim 25, the method further comprising:

instantiating a software object by calling functions of the application programming interface;

configuring the software object for use by the image server to provide the customized image; and configuring the software object to designate an image format from the set of ranked image formats as a preferred image format.

27. The computer-readable medium of claim 25, wherein the image formats are selected from the group comprising Flash, SVG, PNG, JPEG, TIFF, BITMAP, and GIF.

28. A system for dynamically publishing an image in a web page accessible to a variety of web browsers, the system comprising:

a web server that integrates computer-executable code with a dynamic web page sent to a web browser in response to a request from the web browser for a dynamic web page which includes the image, the computer-executable code being programmed to determine web browser configuration information and to request an image according to a set of one or more image formats which are ranked according to ranking criteria predetermined to rank the image formats in order of preference and the web browser configuration information; and an image server in communication with the web server which generates the image and sends the image to the web browser in response to an image request from the web browser, the image request comprising an indicator of the image format selected according to the web browser configuration information and the ranking criteria.

29. The system of claim 28, wherein the web server and image server comprise a single integrated module.

30. The system of claim 28, wherein the computer-executable code is generated by the web server, the computer-executable code comprising computer-executable detection code to detect web browser configuration information, the web browser configuration information including the image formats displayable by the web browser and computer-executable code programmed to request the image according to a highest ranked image format which is displayable in the web browser according to the web browser configuration information.

31. The system of claim 28, wherein in response to the web browser configuration information indicating that the highest ranked image format is not displayable by the web browser, the computer-executable code is programmed to request the image according to the image format which the web browser configuration information indicates is displayable and ranked subsequent to the highest ranked image format within the ranked set of image formats according to the ranking criteria.

32. The system of claim 28, wherein in response to the web browser configuration information indicating that the highest ranked image format is not displayable by the web browser, the computer-executable code is programmed to request the image according to the image format which the web browser configuration information indicates is displayable and ranked next highest to the highest ranked image format within the ranked set of image formats according to the ranking criteria.

33. The system of claim 28, wherein the web server executes a script file which includes an image fallback identifier and based on the image fallback identifier, the web server interprets a web browser identifier to identify a particular type of web browser and generates computer-executable detection code customized to the particular web browser based on the web browser identifier, the computer-executable detection code being programmed to determine the displayable image formats for the browser.

34. The system of claim 28, wherein the web server executes a script file which includes an image fallback identifier and based on the image fallback identifier, the web server interprets a web browser identifier to identify a particular type of web browser and generates computer-executable detection code customized to the particular web browser based on the web browser identifier, the computer-executable detection code being programmed to anticipate the displayable image formats for the browser.

35. The system of claim 28, wherein the web server communicates with the image server to produce the requested image using a dynamic data source, the web server receiving an identifier of data associated with the dynamic data source which the image server has pre-cached from the image server, and incorporating the identifier in computer-executable code for requesting the image such that the pre-cached data is retrieved to generate the image.

\* \* \* \* \*

UNITED STATES PATENT AND TRADEMARK OFFICE
CERTIFICATE OF CORRECTION

PATENT NO. : 7,769,895 B1  Page 1 of 1
APPLICATION NO. : 10/222154
DATED : August 3, 2010
INVENTOR(S) : Williams et al.

It is certified that error appears in the above-identified patent and that said Letters Patent is hereby corrected as shown below:

In column 6, line 14, in the URL, please replace "web sites" with --web_sites--

Signed and Sealed this

Fifth Day of October, 2010

David J. Kappos
*Director of the United States Patent and Trademark Office*